(12) United States Patent
Isnardon et al.

(10) Patent No.: US 8,126,749 B2
(45) Date of Patent: *Feb. 28, 2012

(54) SYSTEM AND METHOD FOR PROCESSING A REQUEST FOR PRICE INFORMATION

(75) Inventors: Bénédicte Isnardon, Nice (FR); Thierry Blaszka, Nice (FR); Frédéric Hoff, Nice (FR); Natalia Perekhvatova, Nice (FR); Rudy Daniello, Nice (FR)

(73) Assignee: Amadeus, Biot (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/925,195

(22) Filed: Oct. 14, 2010

(65) Prior Publication Data

US 2011/0093303 A1    Apr. 21, 2011

(51) Int. Cl.
*G06Q 10/00* (2006.01)
*G01C 21/34* (2006.01)
*G01C 21/36* (2006.01)

(52) U.S. Cl. ................................. 705/5; 705/6

(58) Field of Classification Search .................. 705/5, 6; 715/763
See application file for complete search history.

(56) References Cited

U.S. PATENT DOCUMENTS

| | | | | |
|---|---|---|---|---|
| 6,304,850 B1* | 10/2001 | Keller et al. | ....................... | 705/5 |
| 6,307,572 B1* | 10/2001 | DeMarcken et al. | ......... | 715/763 |
| 6,377,932 B1* | 4/2002 | DeMarcken | ....................... | 705/5 |
| 6,418,413 B2* | 7/2002 | DeMarcken et al. | ............. | 705/5 |
| 6,418,415 B1* | 7/2002 | Walker et al. | ................ | 705/26.2 |
| 7,302,399 B1* | 11/2007 | Donovan et al. | ................... | 705/5 |
| 7,346,526 B2* | 3/2008 | Daughtrey et al. | ............... | 705/5 |
| 7,493,261 B2* | 2/2009 | Chen et al. | ....................... | 705/5 |
| 2002/0022981 A1* | 2/2002 | Goldstein | ......................... | 705/6 |
| 2002/0065688 A1* | 5/2002 | Charlton et al. | ................... | 705/5 |
| 2002/0077871 A1* | 6/2002 | Udelhoven et al. | ............... | 705/5 |
| 2003/0018500 A1* | 1/2003 | Daughtrey | ........................ | 705/5 |
| 2003/0078836 A2* | 4/2003 | Ratliff et al. | .................... | 705/14 |
| 2003/0097274 A1* | 5/2003 | Parsons | ............................. | 705/1 |
| 2003/0125994 A1* | 7/2003 | Jaehn et al. | ....................... | 705/5 |
| 2004/0078252 A1* | 4/2004 | Daughtrey et al. | ............... | 705/5 |
| 2004/0128193 A1* | 7/2004 | Brice et al. | ..................... | 705/14 |
| 2005/0228702 A1* | 10/2005 | Fairbanks et al. | ................ | 705/5 |
| 2007/0233529 A1* | 10/2007 | Isnardon et al. | .................. | 705/6 |
| 2008/0027765 A1* | 1/2008 | Gunn et al. | ....................... | 705/5 |

FOREIGN PATENT DOCUMENTS

WO    WO-01/13299 A2    2/2001

* cited by examiner

*Primary Examiner* — John Hayes
*Assistant Examiner* — Brian Epstein
(74) *Attorney, Agent, or Firm* — Harrington & Smith

(57) ABSTRACT

A computer travel reservation system includes at least one data processor connected with at least one memory that stores software executable by the at least one data processor. Also included is a fare family database connected with the at least one data processor that stores data defining a plurality of fare families each including a plurality of fare classes. The fare family database also stores data defining determination rules used to determine an association of at least one fare family for each fare class, each fare class being defined according to at least commercial parameters. The system further includes a fare fixing engine implemented by the at least one data processor and software. The fare fixing engine is configured to apply the determination rules to a travel product to determine a fare family associated with the travel product.

10 Claims, 15 Drawing Sheets

Fig. 3

Updating of fare family

Commercial fare family class

Enter an existing commercial fare family class name and click on Search or name of new commercial fare family class, then click on Create:

Name of the fare family

Junior

List

Search

Create

Fig. 4

| Updating of fare family |

Commercial fare family class

Name: Junior

Definition [ The lowest junior fares ]

Market - fare family combinations

To add a new combination, specify the dates from which the combination is to take effect, a market and a fare family, then click on Add.

Effective date
From: [   ]

▲ 1 July
   ▲ NCE - US
      ▲ Flash fares
      ▲ Low fare
      ▲ Junior
      ▲ Semi Flex
   ▲NICE Medium haul
▲ 10 October Market: [   ] List
Name of fare family: [   ] List

[ Add ]   [ Delete ]   [ Up ]   [ Down ]

[☐ Increase all]  [☐ Reduce all]
[ Submit ]  [ Cancel ]

Fig. 5

Updating of fare family

Commercial fare family class  Family of fares  Market  Text of the class

Fare family

Name: FLASHFARE

Definition: Special fares for the United States  ☑ Combinable

Rank: [1]  Cabin: [ ]  RIB code [ ]

Text

▶ MAS1
  — Company
  — Travel type code
  — Passenger type
  — Fare travel type
  — Fare number
  — Itinerary number
  — Rule number
  — 1st reservation code
  — Included/Excluded
  — Basis of travel
▲ MAS2
▲ MAS3

| Passenger code type |
|---|
| ADULT |
| CHILD |
| MIL |

[Add] [Delete] [Copy]

[Submit] [Cancel]

New York - Nice

| | 27 July | 28 July | 29 July | 30 July | 31 July | 01 Aug | 02 Aug |
|---|---|---|---|---|---|---|---|
| 02 July | 359 | 270 | 319 | 270 | 270 | 270 | 270 |
| 03 July | 270 | 319 | 319 | 270 | 270 | 270 | 270 |
| 04 July | 270 | 270 | 359 | 319 | 270 | 270 | 270 |
| 05 July | 270 | 270 | 359 | 319 | 270 | 319 | 270 |
| 06 July | 270 | 270 | 270 | 270 | 270 | 319 | 389 |
| 07 July | 270 | 270 | 270 | 270 | 270 | 319 | 389 |
| 08 July | 359 | 359 | 270 | 359 | 270 | 270 | 270 |

Nice - New York

| Flash journeys | Non-refundable – Not valid at weekends | | | | | |
|---|---|---|---|---|---|---|
| | EUR | Flights | Date | From | To | |
| Select | 270 | XX 2312 | 7 July | NCE | PAR | |
| | | XX 6666 | 7 July | PAR | NYC | |
| | | XX 043 | 27 July | NYC | NCE | |
| Select | 272 | XX 1122 | 7 July | NCE | NYC | |
| | | XX 2221 | 27 July | NYC | PAR | |
| | | XX4343 | 28 July | PAR | NCE | |
| Low fares | Refundable with costs – Not valid at weekends | | | | | |
| | EUR | Flights | Date | From | To | |
| Select | 319 | XX 6777 | 7 July | NCE | NYC | Other flights |
| | | XX 7666 | 27 July | NYC | NCE | |
| Junior | Refundable – Not valid on Sundays | | | | | |
| | EUR | Flights | Date | From | To | |
| Select | 359 | XX 1112 | 7 July | NCE | NYC | |
| | | XX 2223 | 27 July | NYC | NCE | |
| Semi Flex | Without restriction | | | | | |
| | EUR | Flights | Date | From | To | |
| Select | 389 | XX 1112 | 7 July | NCE | NYC | Other flights |
| | | XX 2223 | 27 July | NYC | NCE | |

Fig. 7

| Promotion | | | | | |
|---|---|---|---|---|---|
| | EUR | Flights | Date | From | To | |
| Select | 250 | XX001 | 18 July | NCE | NYC | Other flights |
| | | XX002 | 24 July | NYC | NCE | |
| Select | 250 | XX001 | 18 July | NCE | NYC | Other flights |
| | | XX003 | 24 July | NYC | NCE | |

| Flash travel | | | | | |
|---|---|---|---|---|---|
| Select | 270 | XX004 | 18 July | NCE | FRA | Other flights |
| | | XX005 | 18 July | FRA | NYC | |
| | | XX00 | 24 July | NYC | PAR | |
| | | XX342 | 24 July | PAR | NCE | |

Fig. 9

| Paris – Nice | | | | | | | |
|---|---|---|---|---|---|---|---|
| 12 July | 13 July | 14 July | 15 July | 16 July | 17 July | 18 July | |
| 34 | | 34 | 34 | | 34 | 34 | |

| Nice – Paris | | | | | | | |
|---|---|---|---|---|---|---|---|
| 19 July | 20 July | 21 July | 22 July | 23 July | 24 July | 25 July | |
| 23 | 23 | | | | 23 | | |

No special offer available

Fig. 10

Super Promotion

Fig. 11a

| | EUR | Flights | Date | From | To | |
|---|---|---|---|---|---|---|
| Select | 34 | XX001 | 15 July | PAR | NCE | Other flights |
| Select | 34 | XX003 | 15 July | PAR | LYS | |
| | | XX004 | 15 July | LYS | NCE | Other flights |

Super Promotion

| | EUR | Flights | Date | From | To | |
|---|---|---|---|---|---|---|
| Select | 23 | XX002 | 24 July | NCE | PAR | Other flights |
| Select | 23 | XX003 | 24 July | NCE | LYS | |
| | | XX005 | 24 July | LYS | PAR | Other flights |

Fig. 11b

SYSTEM AND METHOD FOR PROCESSING A REQUEST FOR PRICE INFORMATION

FIELD OF THE INVENTION

This invention relates to a system and a method for processing a request from a user in which selling price information relating to travel products is produced and returned to the user.

The invention will apply non-exhaustively, but mainly, to travel products such as flights operated by airlines in a domestic market (inside a particular country or region) or internationally.

This invention relates in particular to a system and a method that enables the user to display a large number of fares for available travel products in response to his request, whilst meeting the sales incentive criteria of the travel provider. The concept of travel provider covers any commercial entity that offers its clients travel solutions. This therefore includes, in particular, the airlines, on-line travel agencies, such as those currently known under the trademark OPODO®, and traditional travel agencies.

BACKGROUND OF THE INVENTION

Powerful fare search products are currently used by travel providers to offer their customers a wide range of low fare travel solutions in response to requests. Thanks to the continued increase in the power of data processing equipment, these products are able to combine a very large number of fares with a large number of possible itineraries with a view to finding the least expensive travel solution corresponding to the customer's request.

This type of low fare search product represents an increasingly higher market share in the field of the travel marketing industry. One consequence of the generalised use of such search tools is the negative impact it is having on the profits of the travel provider. In fact, despite the attraction of such tools for customers and the inherent increase in turnover, a reduction in profitability is observed for a given travel request because only the lowest fare is offered.

To counter this trend towards systematic searching for the lowest fare and to remain profitable, the travel providers currently need to achieve incentive sales of their travel seats by showing the additional services that can be purchased at higher fares. At the same time, in order to remain competitive, they also need to offer the lowest fares possible to capture the clientele in this type of market, particularly through the direct marketing Internet sites.

Generally direct marketing of the provision of travel services is based on systems known as "Low fare search", and offers several low fare travel solutions. However, these products only target the supply of travel solutions at the types of rates that offer the lowest fares without offering any alternative, particularly the types of rates that satisfy the needs of incentive sales of travel providers. Generally speaking, the travel providers are therefore able to supply a large number of travel solutions at low fares but cannot offer solutions that cover several rate classes for the same travel itinerary to reflect different levels of travel restriction (e.g. non-refundable, refundable with costs, refundable, or even without any restriction) and/or various additional services (e.g. type of cabin). Therefore the customer is unable to compare different competing solutions offered with different restrictions and additional services, which means that this type of higher range fare is much less commonly reserved, resulting in a loss of profit to the travel provider.

Document WO-A2-01 13299 discloses an on-line reservation system that is capable of offering the services traditionally provided by traditional travel agents. At the request of the user, which includes an indication of dates and travel itineraries, the system creates a list of fixed fare travel offers. The offers returned to the customer are organised on the screen according to a fare scale (called a Fare Ladder) that enables the offers to be listed in ascending order of selling price. The term "fare" corresponds here to a selling price level.

This type of system adopts a traditional search method called "Low fare search", which shows the lowest available selling prices first.

The administrator of the on-line travel agency cannot himself manage the results of available travel offers issued by the central system (so-called CRS, standing for Computer Reservation System). In particular, he cannot organise them according to "types of fare", which he himself controls. The only organisation produced is an ascending classification by "selling price".

The on-line travel agent representative is also technically dependent on the fare scale organisation (the central fare database) of the central system of the primary travel provider (airline, CRS).

BRIEF SUMMARY OF THE INVENTION

There is therefore currently a need to offer a system that enables travel providers to offer for sale different travel solutions that meet both the user request input criteria and the sale incentive parameters established by the travel provider. In particular, the travel provider would have to be able to offer, simultaneously, several solutions corresponding to a variety of fare types, laying stress on the advantages they offer as far as the higher fares are concerned.

In this context, one technical problem solved by the invention is that of enabling the travel provider to establish data that are to be returned to the customer, including fare data, without having to access the pre-existent fare database.

The invention relates to a solution to this requirement, and to achieve this it provides a method and a system for processing a request from a user using a database containing rules for determining the association with at least one family of fares for each travel fare. When requests for information relating to travel products made by a user are being processed, the travel provider may return various offers by means of the system of the invention, each presented in a predefined fare family. The levels of restriction and services offered in each fare family may be emphasised to the customer in order to encourage him/her to select such travel solutions.

In the case of on-line services in particular (e.g. through a large-scale network such as the Internet, making use of the customer stations and a website), the end user will be able to consult a number of travel options displayed on the screen within different fare families.

One of the advantages of the invention is that it enables the travel provider to organise his fares so that they can be effectively offered at the point of sale to meet his sales incentive criteria. This organisation may be provided according to geographic conditions (definition of the market) and temporal conditions (applicable interval of time).

The organisation of fares thus established involves no modification to the pre-existent fare database and is set up by means of another fare family management database. The invention may therefore easily be applied to existing systems without interfering with their fare database. This flexibility of technical implementation is particularly useful for on-line travel providers who, through a web server, operate a traditional computer reservation system and who also want to be able to personalise their data management and the display of fixed fare travel solutions.

Another advantage of the invention is that it can easily be updated by creating a database whose real time access enables modifications to be taken into account immediately. This point is particularly advantageous since it enables the selling rules applied by the travel provider to be adapted very finely to market developments without jeopardising the integrity of the pre-existent fare database in the central system.

Another advantage of the invention is that its features may easily be integrated in a traditional computer reservation system by implementing a database containing specific data accessible by means of a search engine capable of replying to the requests of users. The other applications implemented at reservation system level do not have to be modified. These may be fare and availability search engines.

Another advantage of the invention is that the rules for determining the association with a particular fare family can be administered by the travel provider himself, thus providing him with considerable freedom of intervention in terms of establishing his sales incentive formulae, whilst at the same time being integrated in a separate global reservation system.

Other objectives and advantages will be evident from the following description of a preferred embodiment of the invention, the purpose of which is not to limit it however.

The invention relates to a travel product reservation system incorporating a central computer reservation system for processing user requests, comprising means for calculating, by accessing a fare database, and returning selling price information relating to travel products, the said reservation system being accessible from at least one user station, characterised in that it comprises:
  a database containing rules for determining the association with a fare family for each travel fare,
  a device for searching for products that meet the input criteria of a user request and associated selling prices, the said device comprising:
    means of communication with the fare family database for gaining access to the rules of determination,
    means for applying the rules of determination to the travel products found for determining their fare family,
    means for sorting the travel products found into fare families so that a reply is returned to the user station, to produce a display, containing data relating to the travel products that meet the input criteria, sorting them into fare families.

This system is presented in preferred embodiment according to the variant set out below:
  it comprises a travel solution search engine communicating with a travel segment database for determining travel solutions that meet the input criteria,
  it comprises means of communication between the travel product search engine and a travel solution search engine, configured to transmit requests from the travel product search engine and return the travel solution data from the travel solution search engine,
  it comprises a fare fixing engine communicating with the fare database for determining the selling prices of the travel solutions found,
  it comprises means of communication between the travel product search engine and the fare fixing engine, configured for transmitting fare requests from the travel product search engine and returning, from the fare fixing engine, the selling price associated with each travel solution found to form the travel products;
  the database includes commercial fare family classes combining a group of fare families and a predefined geographic market, for a predetermined number of travel dates,
  the fare families of each commercial fare family class comprises a hierarchical rank,
  it comprises an interface device connected by a communication network to the user station on the one hand and to the central computer reservation system on the other,
  the communication network is a large-scale network.
  the interface device is a web server interacting with a navigation program residing in the user station to provide a graphic user interface with the user station.

The invention also relates to a method of processing a request from a user wherein information on selling prices relating to travel products is calculated, by accessing a fare database, and is returned to the user, comprising the following operations:
  a database is created containing rules for determining the association with at least one fare family for each travel fare,
  a request for information relating to travel products for at least one travel date is received from a user station,
  the products meeting the request input criteria and the associated selling prices are sought,
  the rules of determination contained in the fare family database are accessed,
  the rules of determination are applied to the travel products found to determine their fare family,
  the travel products found are sorted by fare family,
  a reply containing data relating to the products that meet the input criteria is returned to the user station, for display, by sorting them into fare families.

This method preferably comprises the following additional stages:
  information relating to the product that meets the input criteria and has the lowest selling price for each travel date is returned to the customer station, for display,
  one of the products displayed is selected when the user enters the user station,
  a request for detailed information is addressed from the user station,
  a reply containing information relating to the selected product and other products that meet the input criteria for the same date is returned to the user station, for display, by sorting them into fare families,
  for each fare family, only a pre-established number of products that meet the input criteria is displayed, starting with the product having the lowest selling price,
  the input criteria include the origin (starting point), the journey destination and a non-zero number of departure dates,
  in the database commercial classes of fare families are created combining at least one group of fare families with a predetermined geographic market for a predetermined number of travel dates,
  at least one commercial class of fare families is selected and the user's request is only processed for the travel products included in the commercial fare family class or classes selected,
  the selection of the commercial fare family class or classes is made via a user station input,
  the selection of the commercial fare family class or classes is made by an administrator,
  a hierarchical rank is assigned to each fare family in the database for each commercial fare family class, at the user station information is displayed relating to the products that meet the input criteria in the order of their hierarchical rank, the rules of determining the association with a fare family include, for each fare family, a set of attributes that a fare must have to be associated with the said fare family, the data in the database of fare families are accessed in real time, the travel products are air flights that are included in a domestic or international market.

BRIEF DESCRIPTION OF THE DRAWINGS

The attached drawings are provided by way of examples and do not limit the scope of the invention. They merely represent one embodiment of the invention and will enable it to be easily understood.

FIGS. 3, 4 and 5 show an example of a graphic interface for the management of fare families and, in particular, for their updating.

FIGS. 6 and 7 show a first example of processing requests with the provision of fare scale solutions for each outward-return itinerary.

FIGS. 8 and 9 show the provision of a fare fixing solution of the SPECIAL OFFER type.

FIGS. 10 and 11a and 11b, collectively referred to as FIG. 11, show such fare solutions with the fixing of fares for each origin/destination pair.

DETAILED DESCRIPTION

Henceforth in the description the following terms are used:

selling price: amount established in a given currency corresponding to a value that is determined for a travel solution, fare: fare fixing class defined according to the commercial parameters and services offered in the travel solution. It may, for example, be a question of "business class", "junior" or even "economy" fares, travel service provider: person or company capable of procuring the service offered for sale. This may include airlines, travel provider: person or company providing the commercial interface with the user and offering the travel products to the customers, travel solution: definition of the services (in particular a seat, possibly with additional services (meals, etc.) on an airline flight) that meets the requests entered by the user (including specification of the itinerary, date and possibly travel times), travel product: combination of a travel solution and a selling price to form a complete commercial offer.

Figure 1A:
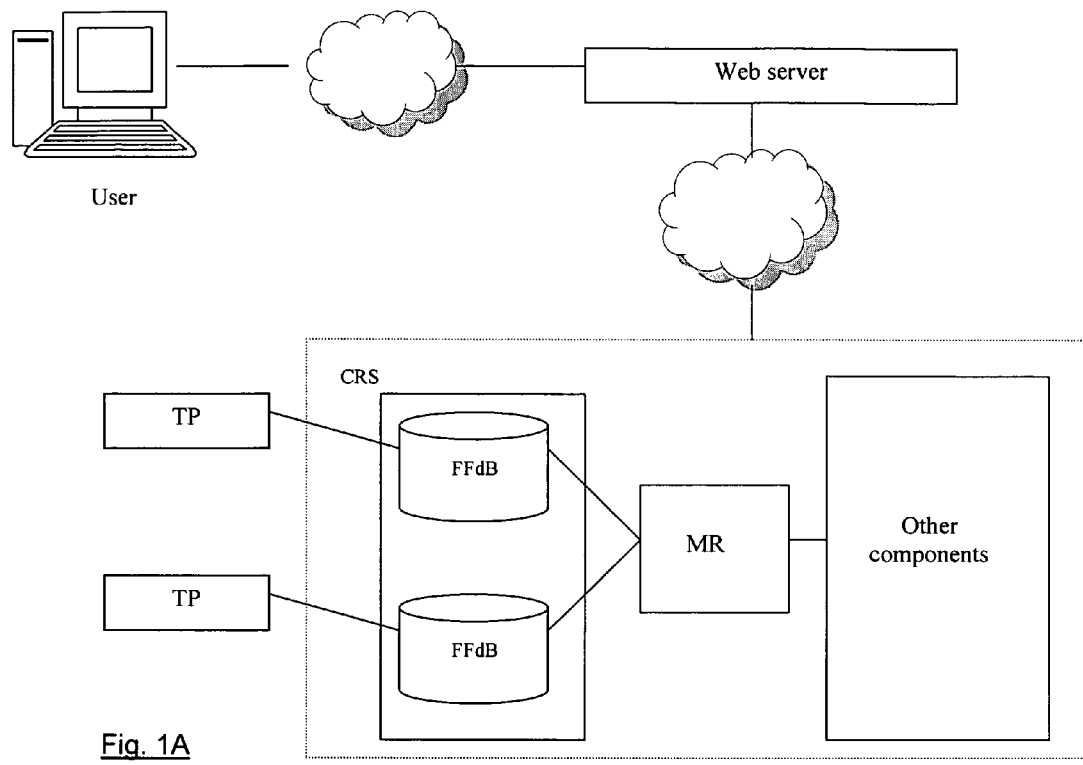
FIG. 1A shows an example of the general architecture of the system according to the invention.

FIG. 1A shows a possible architecture according to the invention in which different components communicate by means of networks such as large-scale networks, particularly the Internet. According to the embodiment shown, a user is connected by means of a user station to a website server based on a traditional communication data processing configuration. This server is operated, for example, by an on-line travel agency. In particular, the communication may be made by means of data processing components of the server of the types normally called PROXY and GATEWAY types. The same type of communication may be used between the website server and other components integrated in the system called known as CRS (central computer reservation system).

Here the computer reservation system incorporates various components capable of receiving requests and inquiries regarding the availability of travel products, checking availability in the inventory bases of the travel providers (e.g. the inventory bases of airlines) and supplying the user with information on fare scales.

Figure 1B:
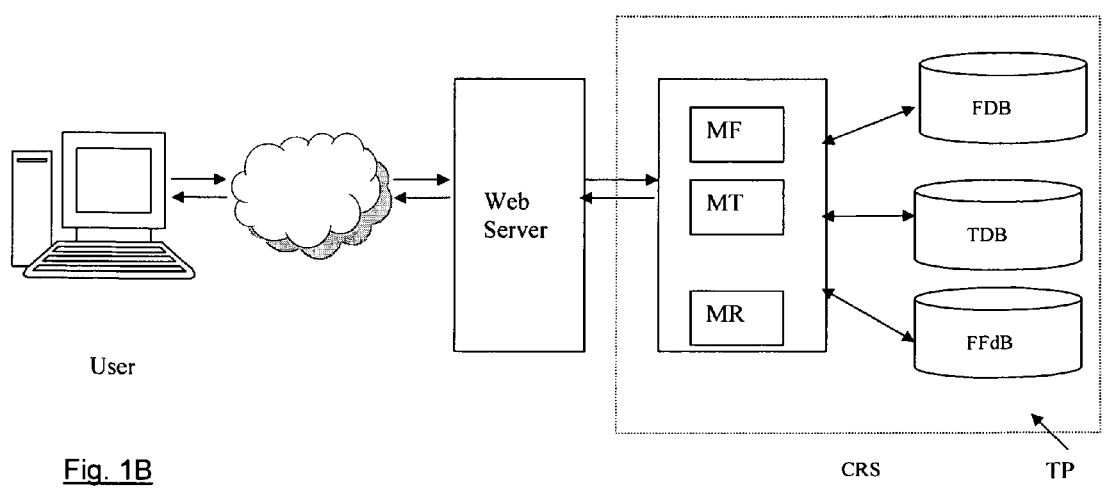
FIG. 1B shows, more precisely, the interaction between different components.

FIG. 1B shows the components in greater detail.

A travel solution search engine (MF) is therefore capable of searching in at least one travel segment database (FDB) for flights that are able to meet the search criteria.

When these solutions are found the fare is determined by means of a fare scale engine (MT) which accesses a fare database (TDB). A complete travel product can therefore be offered to the customers with a travel solution and the associated selling price.

In addition to these components implemented in a computer reservation system (CRS), the system according to the invention comprises a database (FFdB) containing rules for determining the association with a fare family for each travel fare, as well as a search engine (MR) communicating the database. The engine (MR) is configured to process the requests for information sent by the user. Such an engine (MR) is structurally similar to those used in existing low fare search engines.

According to a preferred embodiment, the travel providers (TP's) have access to the database (FFdB) mainly for updating it or carrying out the desired modifications relating to the rules of determination that will be described in more detail below.

It should be remembered that the invention enables different fare solutions to be offered for sale to the user. To achieve this, the travel products are sorted according to the invention on the basis of the family of fares to which they belong. The parameters of this sorting, and hence the criteria of association with a fare family, determine the types of travel solution that will be offered for sale.

Figure 2:
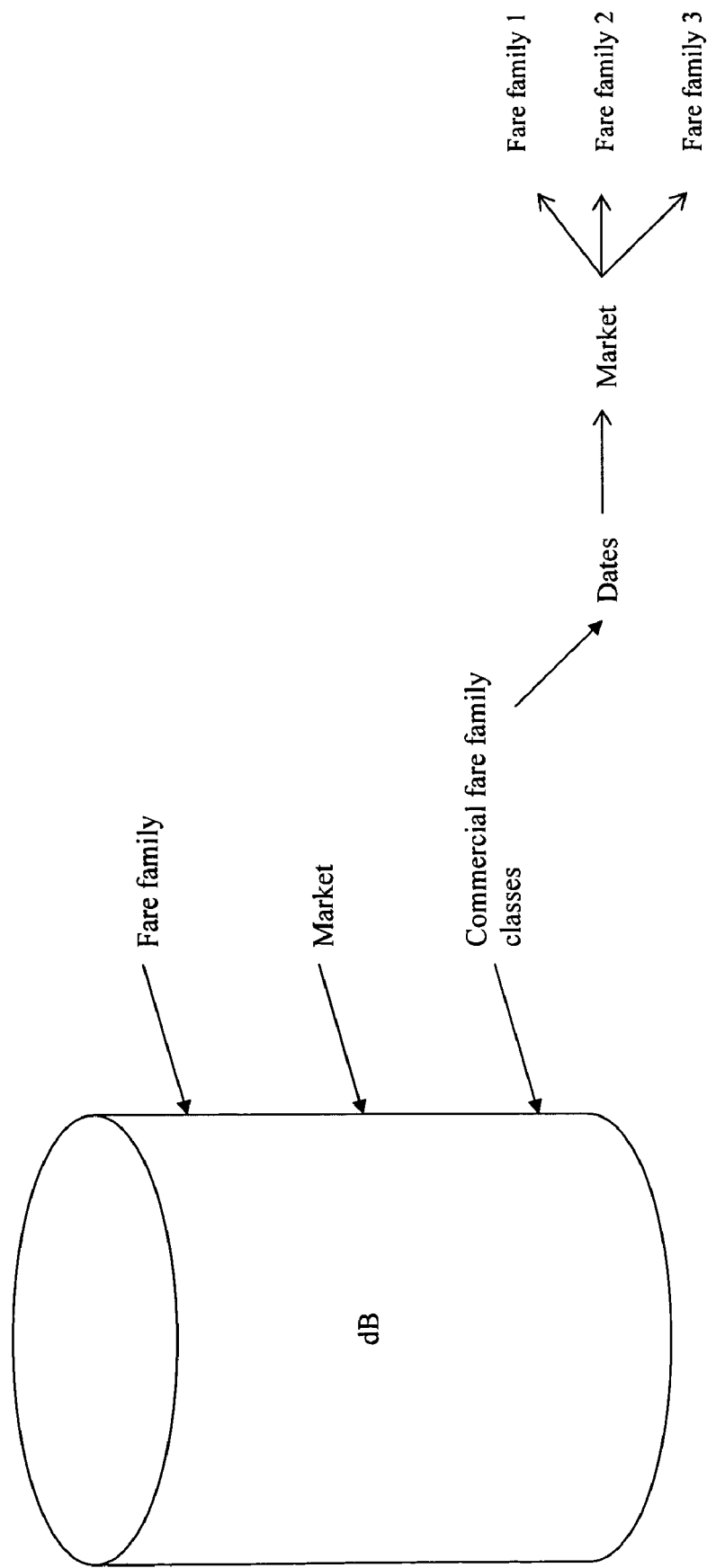
FIG. 2 shows more precisely the data contained in the database used by the invention.

FIG. 2 shows the information contained in the database (FFdB). In this figure the fare families are entered in the database. Markets corresponding to the geographic areas of application of a number of fare families are also established. These markets may be national, regional or even international territories. It is also possible for the market to be systematically defined as global.

The database FFdB also enables the commercial fare family classes to be defined. These commercial classes are associated with a fare family group and a geographic market for a predetermined number of travel dates.

If the pertinent dates and the market considered are known, it is possible to find the fare families belonging to the commercial fare family class, then to know their attributes.

The modifications to the content of the database FFdB easily enable the travel provider to change his classes of commercial offers. For example, an on-line travel agency may (by updating the FFdB database and without modifying the TDB database) exclude from the searches certain types of fares which would not be suitable for his market. The agency may therefore modify a fare organisation whose primary data it does not control (the TDB database is preserved, which means that it can be used, for example, by another travel agency web server).

It will be noted that the FFdB database therefore enables a travel provider to manage travel product replies issued by different systems with different TDB fare databases. In this case the FFdB database and its use enable the replies issued by different fare fixing systems to be harmonised. For example, a "junior" fare issued from a TDB fare database may be classed in the same family of fares as a "teenager" fare in another fare fixing system if the travel provider considers that they are comparable. The information produced for the customer is more readable because it does not require the customer to have a detailed knowledge of the multiplicity of fares of different service providers or CRS.

An example of updating a fare family is given below with reference to FIGS. 3 to 5 for modification (additions, updating, etc.) of the database (FFdB).

FIG. 3 shows an example of windows that can be displayed at an administrator station for updating fare families. In FIG. 3 the user indicates the displayed page by indicating the name of the commercial fare family class on which he wants to work. He may possibly request the display of the list of commercial classes already defined.

With the SEARCH icon the user may search the definition elements of a commercial fare family class whose name he has entered. With the CREATE icon he can add the commercial fare family class under the name he has previously entered.

In the example shown the word JUNIOR has been entered and the user has clicked the SEARCH icon.

He then reaches the window shown in FIG. 4 displaying the definition elements of the commercial fare family class called JUNIOR. A brief commercial definition is assigned to this class under the term "The lowest junior fares".

The criteria for market-family association of fares are also displayed on this page for certain dates. In the example, for the range of dates between 1 July and 10 October, and for the Nice-United States market (NICE-US), the commercial class is associated with the fare families called: FLASH FARES, LOW PRICE, JUNIOR, SEMI-FLEX.

These names correspond to fare families previously entered in the database.

In the window in FIG. 4 the administrator may modify the criteria for defining the commercial fare family class, e.g. by altering or adding the dates, the applicable markets or even the associated fare families. For example, the user can click on the fare family FLASH FARE to change the definition of this fare family.

Referring to FIG. 5, the administrator sees the display indicated for the family called FLASH FARE. A brief definition of this given under the expression "special fares for the United States".

Different attributes are organised in the form of a set of attributes (MAS1) indicating different characteristics of this family. To belong to this fare family the travel products must have a predetermined value for each of these attributes. It is possible to use several sets of attributes (MAS1, MAS 2, MAS3) to define the rules of association with this fare family.

The fare families of a commercial class of fare families preferably have a hierarchical order included in the RANK parameter in FIG. 5. In this context the example shows that the FLASH FARE family has rank 1 for the commercial fare family class junior. On the display of travel solutions in response to customer requests, it is the solutions offered in the context of the FLASH FARE family that will be displayed first. The other fare solutions will be displayed in ascending or descending hierarchical order, according to the preferences of the travel provider.

Figure 12:
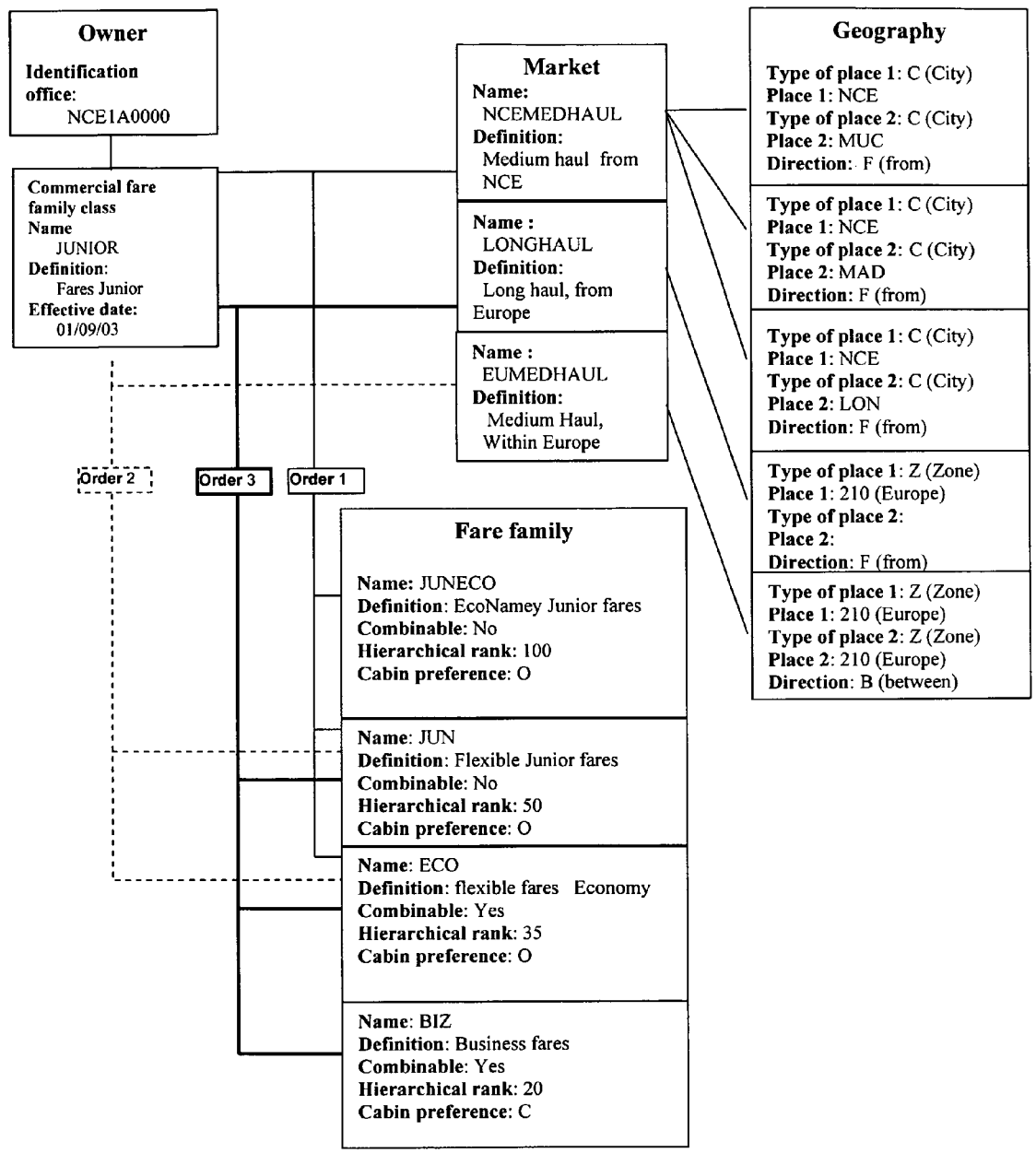
FIGS. 12 and 13 show two examples of the definition of a commercial fare family class.

FIG. 12 shows a diagram illustrating the definition of a commercial fare family class.

This figure indicates an identifier for the owner of the commercial fare family class, e.g. for locating the definition of this commercial class belonging to (or used by) a predetermined travel provider in order to distinguish it from the commercial fare family classes belong to (or used by) other travel providers.

In the case shown, the commercial fare family class bears the name JUNIOR, and includes a predetermined effective date, namely 1 Sep. 2003. This JUNIOR commercial fare family class is applicable to the market defined by combining the elementary markets bearing the following names: NCEMEDHAUL, LONGHAUL and EUMEDHAUL. A more precise indication of the geographic coverage of these markets is also indicated in the GEOGRAPHY column. The markets may be a combination of origins (starting point) and destinations, in the form of pairs of cities, or may relate to larger geographic areas such as France, Europe or the United States. A market is fully defined by the indication of a geographic space of origin and geographic space of destination of the journeys.

Once the dates of application of the commercial fare family class and the relevant market have been determined it is possible to establish the fare families that belong to the commercial fare family class JUNIOR. In the case in question these fare families are called JUNECO, JUN, ECO and BIZ. In the case shown, these fare families are not applicable to all markets. On the contrary, for the NCEMEDHAUL market, only the fare families JUNECO, JUN and ECO are applicable. However, for the EUMEDHAUL market, the fare families JUN and ECO are concerned. Finally, for the LONGHAUL market, the fare families JUN, ECO and BIZ are included. A hierarchical order (order 1, 2 or 3) is given in this definition to indicate the precedence in the order of study of the markets.

Figure 13:
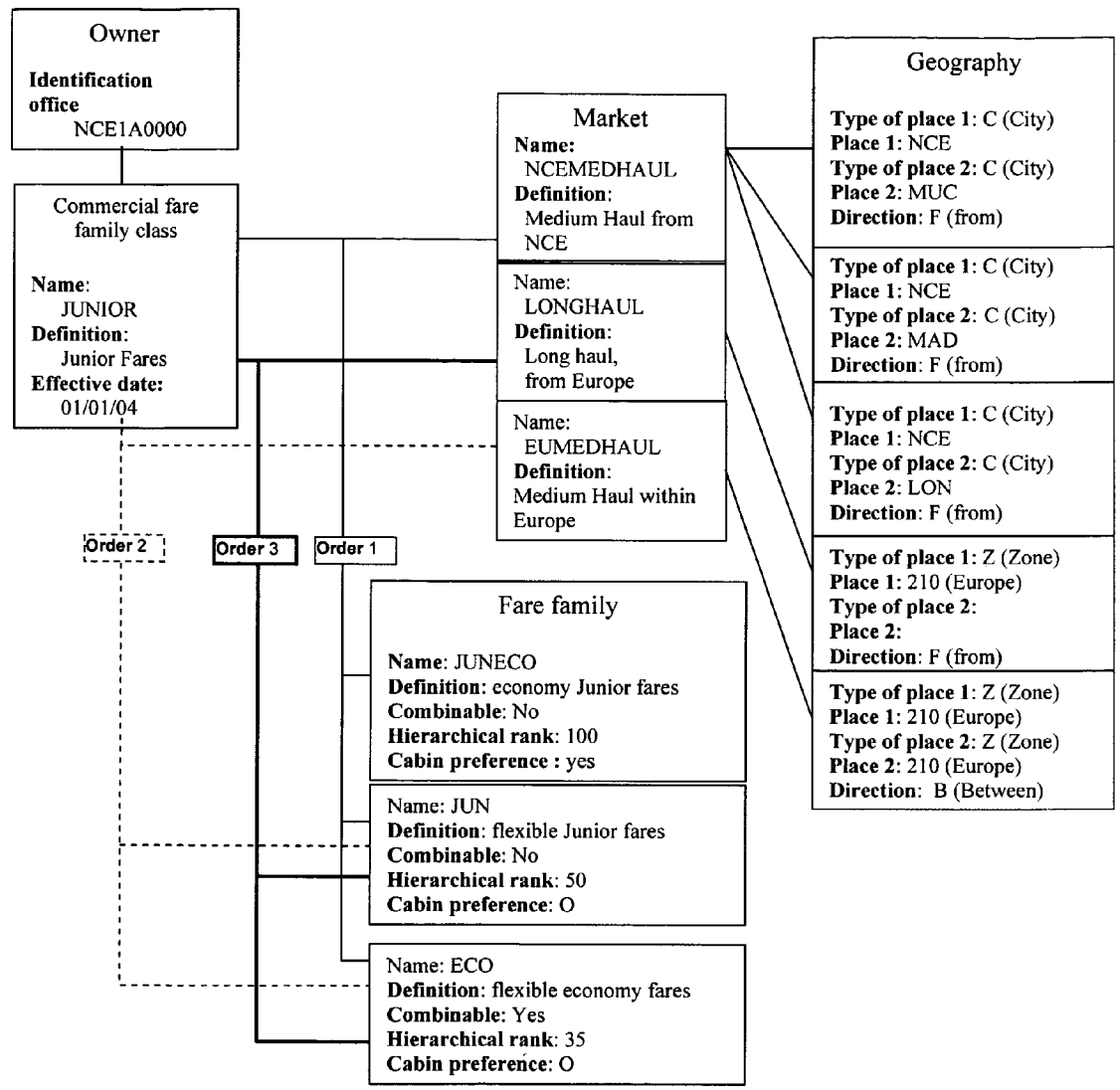

Another example of the definition of commercial fare family class is given in FIG. 13, with an effective date of 1 Jan. 2004 and markets defined in the example in FIG. 12. Unlike FIG. 12, the fare families included in the commercial fare family class for the markets in question are different for the dates considered.

Figure 14:
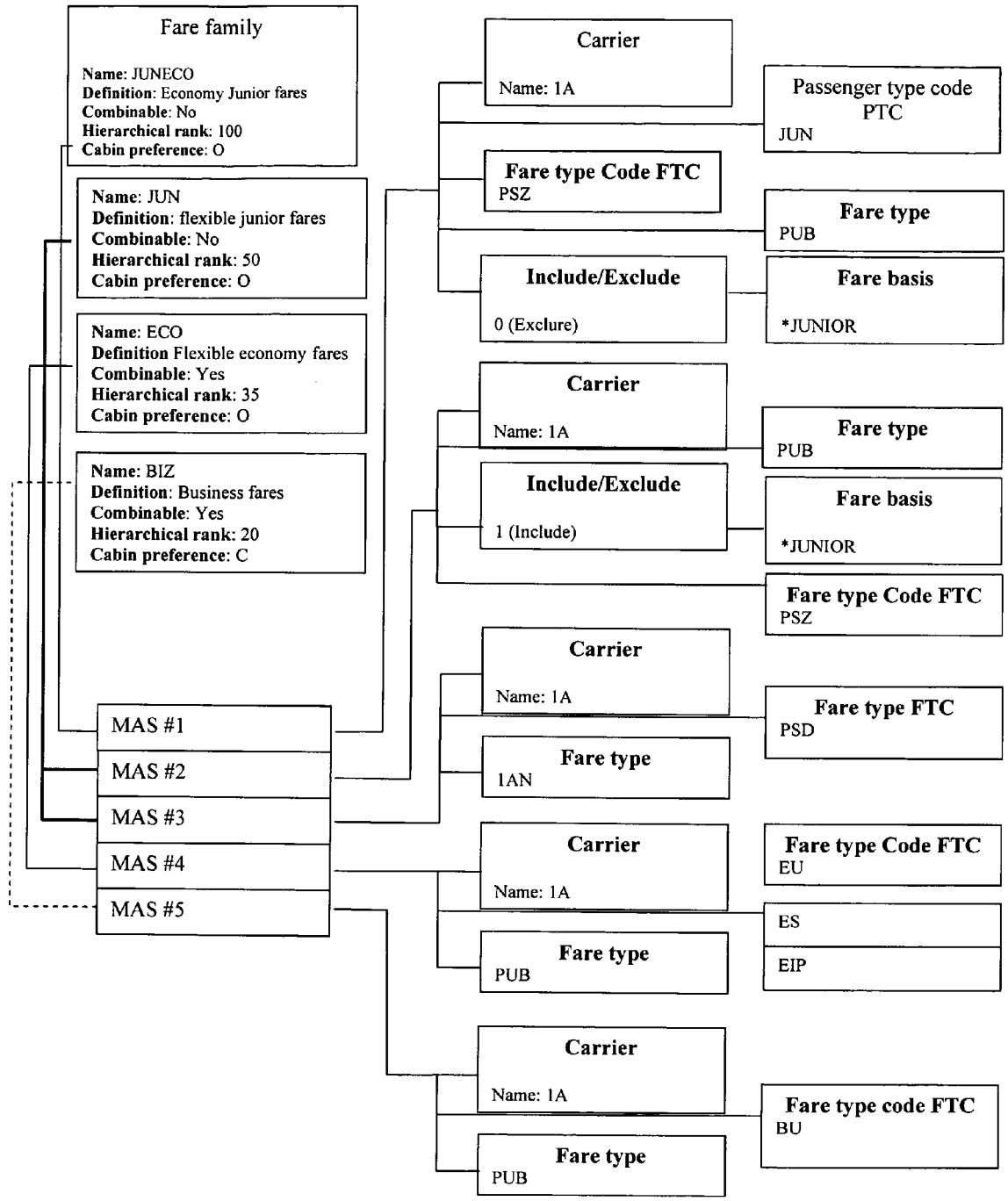
FIG. 14 shows an example of the definition of a fare family using sets of attributes which a fare must exhibit to belong to a particular fare family.

FIG. 14 is a diagram showing in greater detail an example of rules for determining the association with a fare family. In this context different fare families have been shown under the names JUNECO, JUN, ECO and BIZ, which were already shown in FIG. 12 for the definition of the commercial fare family class JUNIOR.

To determine which travel product fares belong to these fare families, sets of attributes which a fare must have to belong to a certain family are defined. These sets of attributes are referred to as MAS1, MAS2, MAS3, MAS4 and MAS5 in FIG. 14. For example, in the case of the fare family JUNECO, the attribute set MAS1 must be verified for a fare of a travel product to belong to that family. The attribute set MAS1 is here formed by a carrier value (here 1A), a passenger type code value (here JUN for junior), a fare type coding value (here PSZ) and a fare type value (here PUB). Moreover, a fare inclusion or exclusion parameter may be used in conjunction with a fare name list. In this case the JUNECO family excludes the fares containing JUNIOR in their names.

The attribute sets of the other fare families (JUN, ECO and BIZ) are similarly defined, as shown in FIG. 14.

Once the commercial fare family classes have been determined in this manner, particularly by an administrator belonging to a travel provider such as an airline, the user requests relating to information on travel products can be processed. For this processing the rules established for returning the fare information will be applied. In particular, the travel products offered in response to the user requests will depend on the rules established by the administrator of the database (FFdB).

Various examples of request processing are described below.

In his request for information the user may specify the commercial class or classes for which he wishes to obtain information on the travel products. For example, the user may specify, via a web server, that he wants commercial classes corresponding to promotional offers and to offers for a certain public (such as offers intended for juniors). This being the case, the selection of the commercial classes for which information on the travel products is to be supplied to the user, following his request, may be made "upstream" by an administrator of the travel provider, such as an airline.

Figure 6:

In the case shown in FIGS. 6 and 7, the user initially sent, via his user station, a request for information relating to flights of airline carriers for a predetermined number of departure and arrival dates. In this case the user indicated his wish to depart from Nice to New York between 2 and 8 July, and return to Nice between 27 July and 2 August. In the case shown, the commercial fare family classes applicable were defined by the upstream travel provider. The request for information is transmitted via the web server to the central system for processing.

At this stage a first user information stage is preferably carried out by returning to him, for the dates considered, a table giving him information on the products that meet the parameters he has entered, showing the lowest selling price for each travel date.

The user then selects, for example by means of a pointer, one of the travel products (in the case shown by clicking on the fare associated with it and displayed).

This selection automatically triggers the forwarding, from the user station, of a request for detailed information on the travel product considered.

The central system therefore carries out thorough processing in which a reply is returned to the user station containing information relating to all the travel products that meet the input criteria, i.e. the criteria relating to the starting point, destination and date of the travel product selected in the first window by the user, sorted into fare families.

After the first selection screen the user therefore receives a full reply containing not only information relating to the travel product, showing the lowest price, but also other travel solutions and, in particular, solutions belonging to different fare families with a price that may be slightly higher but includes services of a higher level. An example of a display for the user is shown in FIG. 7.

This configuration enables the low fare search functionalities (initial response) to be combined with functionalities that enlarge upon the solutions offered (second response).

However, it is possible to supply the enlarged response directly, particularly if the input criteria do not include a range of dates.

An administrator may determine in advance the number of travel products that will be displayed to the user in a predetermined fare family. In order to display more solutions in a particular fare family, a hypertext link under the term "other flights" may possibly be implemented. This provides access to other travel products priced the same as that or those displayed in the fare family considered.

In the example shown, the user obtains information relating to the cheapest flight available, at €270. In the same fare family (FLASH TRAVEL) another solution is offered him at the fare of €272. Other solutions are then offered in different fare families called LOW FARE, JUNIOR AND SEMI-FLEX. A fast, adaptable text informs the user of the general services offered in each of these fare families according to the restrictions (non-refundable, refundable, etc.) and the flight conditions (for example, days on which these fares are applicable).

This information, thus summarised, enables the customer to select the flight most suitable for his purposes, which is not always the flight with the lowest fare.

It is also possible, for the input criteria considered, that travel products may not be available in all cases, and in particular for all the dates required by the traveler. Thus in FIG. 8, for a an outward and return Nice-New York request, with date intervals departing between 12 and 18 July and returning between 18 and 26 July, the availability is limited on certain dates. This is the case, for example, when the commercial fare family class and the fare families it includes relate to promotions whose exceptional nature does not enable the travel products to be offered for sale for all dates.

Figure 8:
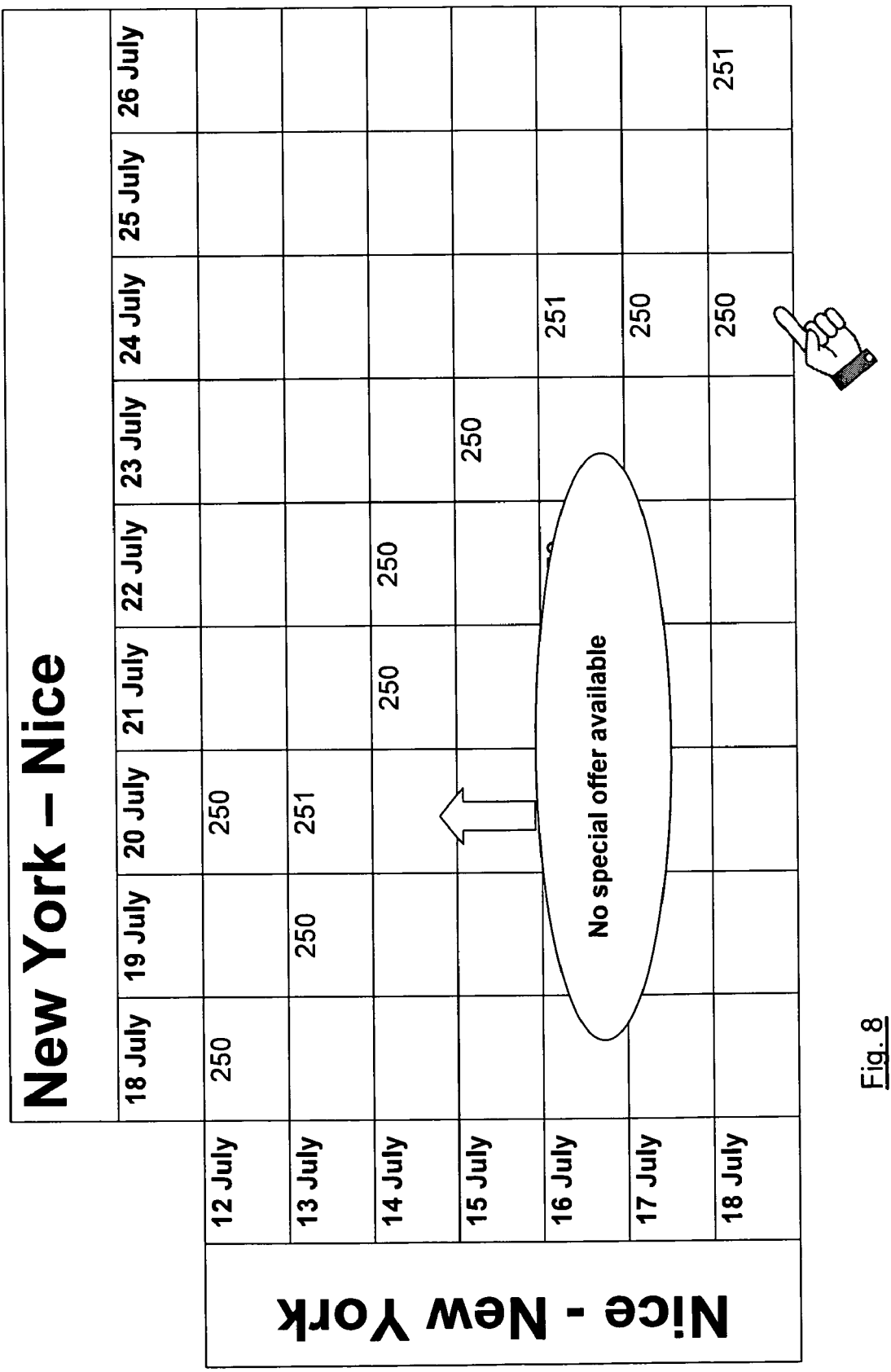

In the case shown in FIG. 8, the lowest fares for travel products that meet the input criteria are displayed for selection by the user. For example, the user selects the fare of €250 departing on 18 July and returning on 24 July. A request for additional information is then sent to the central system for carrying out the processing previously described and for displaying fare information on the travel products meeting the criteria for different fare families included in the predetermined commercial class. The user may therefore consult the families PROMOTION and FLASH TRAVEL.

A similar example is given in FIGS. 10 and 11*a*, 11*b*, with a slightly different presentation showing a first display by route (Paris-Nice, then Nice-Paris), instead of a table with two outward and return entries.

In response, the second display shows two different tables with the products here meeting the criteria solely in the SUPERPROMOTION fare family.

It is understood here that the user may be an end customer but also a travel agent, or even an employee of a company having an internal travel management department.

Similarly, the travel products may be travel seats for a specific route on a specific date, or for a range of dates; the routes may be single outward or outward-return, in a single segment or with stopovers.

The term reservation system used here is understood to relate to a computer system that is at least capable of informing the user about prices and conditions of sale of travel products, but should also preferably enable reservations to be made by the user, with or without the issue of a ticket.

The administrator entrusted with updating the database may be an employee of the travel provider (such as an airline or on-line travel agency), but may also be an employee of a global distribution system providing the management of the central reservation system (CRS).

As indicated previously and with reference to FIG. 1, the architecture proposed advantageously includes an interface device between the user station and the central CRS system in the form of a web server communicating with the user station and the central CRS system via a large-scale network of the Internet type. It is therefore the server that produces the pages to be displayed at the user station, who therefore only requires a navigator of current design (of the type Internet Explorer™)

for the functionalities required to display the information and send the requests for information.

Finally, it should be noted that the central CRS system may be connected to several web servers for supplying information to the users via several Internet sites. For example, an Internet site may be especially dedicated to one type of clientele and may only apply certain commercial fare family classes, whilst another Internet site will be dedicated to other types of clientele by operating with other commercial fare family classes.

Figure 15:
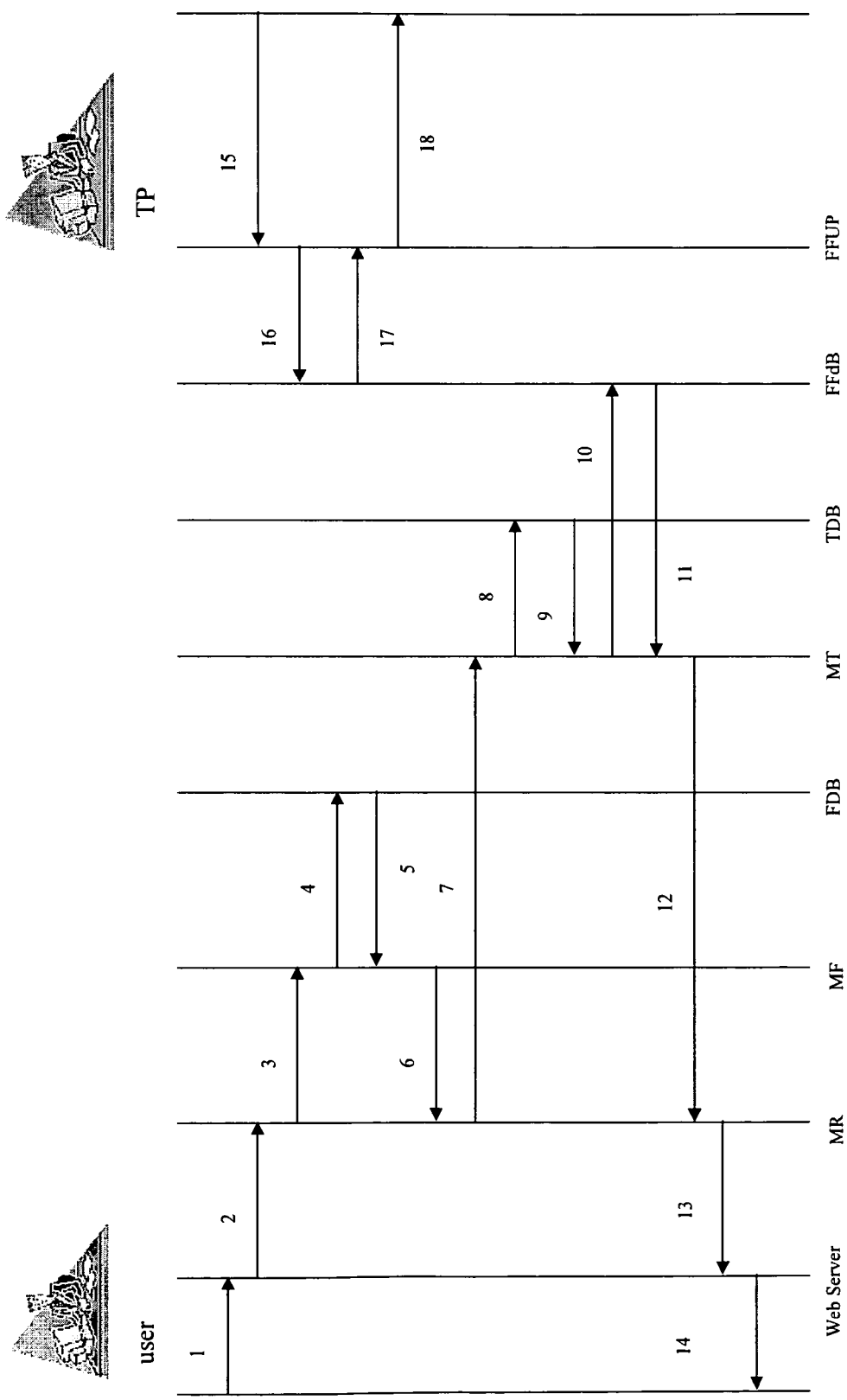
FIG. 15 shows a graph of stages used by the invention in a preferred embodiment.

An example of how the different stages of the invention are linked is summarised below with reference to the example shown in FIG. 15.

1—the user requests a travel product for a particular journey, specifying the travel dates, cities visited and any other preference permitted by the user's application. This request is sent to the web Server for processing, 2—the Web Server formats and sends the request to the engine MR, adding its identifiers and default options, and including the commercial fare family class to be used, reflecting the type of selling incentive defined by the travel provider, 3—on the basis of this input the engine MR requests travel solutions from the engine MF, 4—the engine MF requests the database FDB for travel solutions for departure and arrival segments required, as well as information regarding the availability of seats, 5—the segments proposed are returned by the database FDB, 6—the travel solutions are constructed by combining the departure and arrival segments offered, and are returned to the engine MR, 7—the engine MR requests travel proposals from the fare fixing engine MT by sending the initial request and the travel solutions produced by the engine MF, 8—the fare fixing engine MT requests the fare database TDB for the fares applicable to the travel solutions, 9—the valid fares are returned to the fare fixing engine MT 10—the fare fixing engine MT requests the fare families corresponding to the commercial fare family class specified on entry to the fare family database FFdB, 11—the valid fare families are returned to the fare fixing engine MT, 12—the fare fixing engine MT calculates price solutions by combining the journeys. The travel offers are constructed by combining the price solutions with the travel solutions. The fare fixing engine MT returns to the engine MR the travel offers with their associated fare family.

13—The engine MR returns these travel offers to the Web Server,

14—The Web Server formats the output data, then returns the different offers grouped into prices and fare families.

15—If there is reaction from the competition, the travel provider uses a tool for updating via the Internet to request that the definition of his own fare families be updated directly in the database FFdB.

16—The updating tool processes the request by updating the database FFdB in real time.

17—The database FFdB takes account of the updates.

18—The travel supplier is informed that these updates have been stored in the database FFdB. Because of this the travel requests processed after that update will automatically take account of the new fare families.

The invention claimed is:

1. A computer travel reservation system, comprising:
at least one data processor connected with at least one memory that stores software executable by the at least one data processor;
a fare family database connected with the at least one data processor and storing data defining a plurality of fare families each comprised of a plurality of fare classes, the fare family database also storing data defining determination rules used to determine an association of at least one fare family for each fare class, each fare class being defined according to at least commercial parameters; and
a fare fixing engine implemented by said at least one data processor and software, the fare fixing engine configured to apply the determination rules to a travel product to determine a fare family associated with the travel product.

2. The computer travel reservation system according to claim 1, and further comprising an interface configured to receive travel product inquiries and at least one travel product search engine.

3. The computer travel reservation system according to claim 1, where the commercial parameters comprise at least one predetermined geographic market and a predetermined effective date.

4. The computer travel reservation system according to claim 1, where the fare family database enables a commercial class of fare family to be defined, the commercial class of fare family being associated with a fare family group and a geographical market for a predetermined number of travel dates.

5. The computer travel reservation system according to claim 4, where fare families of the commercial class of fare family have a hierarchical order indicated by a rank parameter.

6. The computer travel reservation system according to claim 4, where the determination rules comprise, for each fare family, a set of attributes that a commercial class of fare family must have to be associated with the fare family.

7. The computer travel reservation system according to claim 1, where a fare family comprises a set of attributes indicating fare family characteristics and rules of association for the fare family whereby, to belong to the fare family, a travel product needs to have a predetermined value for each attribute in the set of attributes.

8. The computer travel reservation system according to claim 1, where travel products are air flights.

9. The computer travel reservation system according to claim 1, further comprising a user interface configured to allow a user to create and edit fare families in the fare family database.

10. The computer travel reservation system according to claim 9, where the user is a travel provider.

* * * * *

UNITED STATES PATENT AND TRADEMARK OFFICE
CERTIFICATE OF CORRECTION

PATENT NO. : 8,126,749 B2
APPLICATION NO. : 12/925195
DATED : February 28, 2012
INVENTOR(S) : Bénédicte Isnardon et al.

It is certified that error appears in the above-identified patent and that said Letters Patent is hereby corrected as shown below:

In the first column of the Title page, insert a Related U.S. Application Data section to include the priority applications listed in the Declaration, Specification and Transmittal of New Application form of the original filing as follows:

--(60) Continuation of application No. 10/581,301, filed as application No. PCT/EP2004/053162 on November 29, 2004, now Pat. No. 7,840,425.--

In Column 1, line 3, insert:

--CROSS-REFERENCE TO RELATED APPLICATIONS

This patent application is a continuation of pending US Patent Application S.N. 10/581,301, filed on 06/01/2006, which in turn claims priority from PCT/EP2004/053162, having a priority date of 12/02/2003.--

Signed and Sealed this
Twelfth Day of March, 2013

Teresa Stanek Rea
*Acting Director of the United States Patent and Trademark Office*